March 31, 1931. C. HARTER Re. 18,018
CARLINE REENFORCEMENT AND LOAD LIFTING ARRANGEMENT
Original Filed Feb. 7, 1925 2 Sheets-Sheet 1
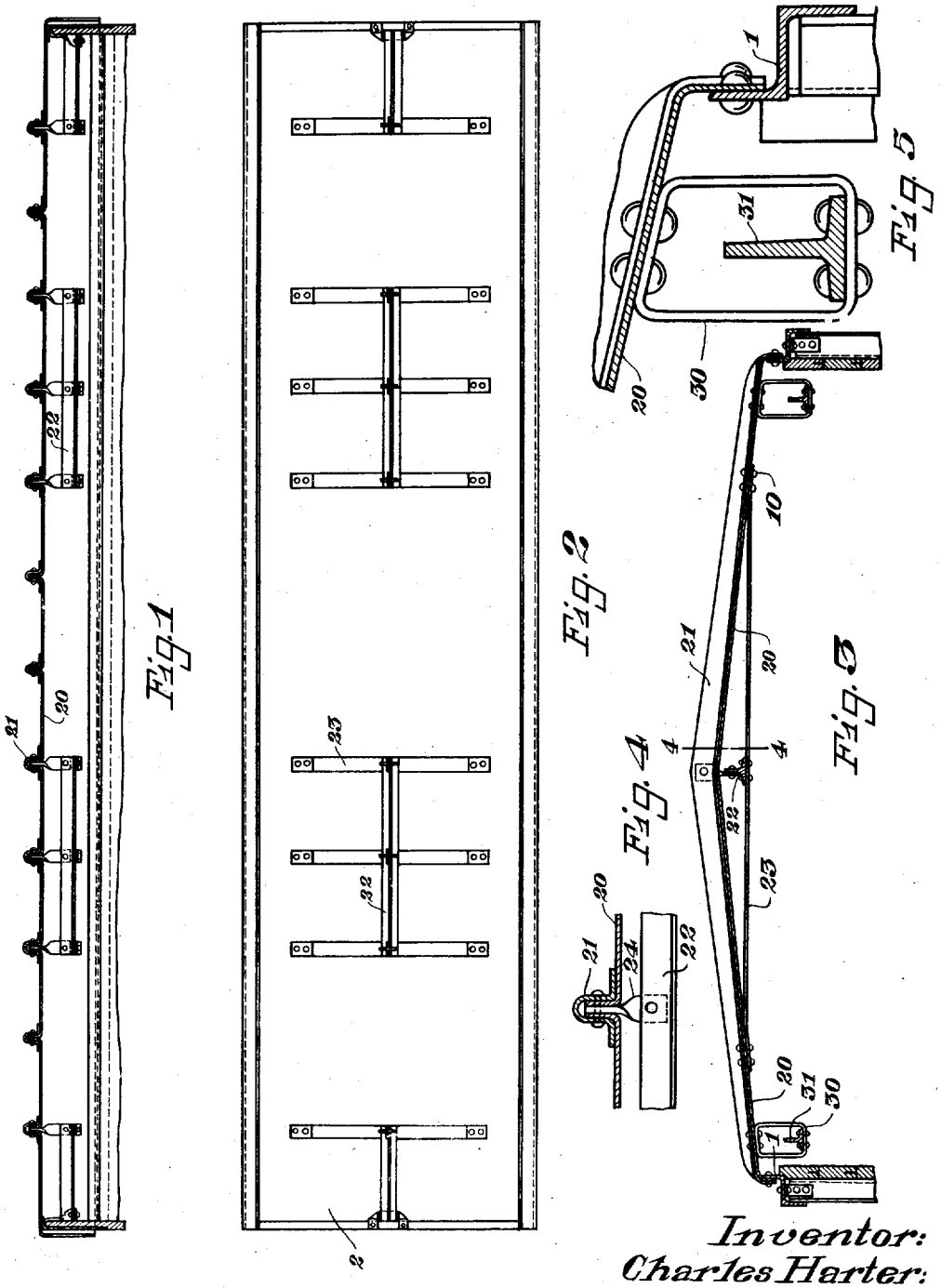
Inventor:
Charles Harter:
Linton E. Sisson,
Attorney March 31, 1931. C. HARTER Re. 18,018

CARLINE REENFORCEMENT AND LOAD LIFTING ARRANGEMENT

Original Filed Feb. 7, 1925 2 Sheets-Sheet 2

Inventor
Charles Harter
Clinton E. Sisson
Attorney

Reissued Mar. 31, 1931

Re. 18,018

UNITED STATES PATENT OFFICE

CHARLES HARTER, OF ST. LOUIS, MISSOURI, ASSIGNOR TO P. H. MURPHY COMPANY, OF NEW KENSINGTON, PENNSYLVANIA, A CORPORATION OF PENNSYLVANIA

CARLINE REENFORCEMENT AND LOAD-LIFTING ARRANGEMENT

Original application filed February 7, 1925, Serial No. 7,560. Divided and application filed January 25, 1926, Serial No. 83,562. Original No. 1,678,509, dated July 24, 1928. Application for reissue filed July 9, 1930. Serial No. 466,897.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

In some cars the roof structure comprises carlines spanning the distance between the opposite side plates with metallic roof sheets spanning the spaces between the adjacent carlines. These roof sheets are sometimes secured to the carline making what is known as a rigid steel roof and sometimes positioned loosely between the carlines making what is known as a flexible steel roof. In such types of roofs the bottoms of the carlines are substantially flush with the bottom of the roof sheets, thus obtaining a flat interior surface. With such roofs it is frequently impossible to secure a rope or chain or ice tong to the carline, or in fact, to any other part of the roof, therefore, it is difficult and cumbersome to move heavy ladings into, out of or around in the car. I have disclosed a modified form of my device applicable to such types of roofs. In such so-called "all steel" roofs my device reenforces the roof even if the roof sheets are rigidly secured to the carlines, but are particularly advantageous when the sheets are loosely positioned between the carlines because such roof sheets perform no gusset function.

The invention resides in providing means to reinforce the roof structure, which means also provides a place for attachment of a load lifting device by being positioned in spaced relation to the adjacent parts of the car so that a rope or chain of a load lifting device may be thrown over it and/or providing a place of attachment of an ice tong or similar mechanism of a load lifting device so that said means may also be used to assist in loading or unloading the car.

The invention reenforces the individual carlines to sustain vertical loads; obtains cooperation between the adjacent carlines to sustain horizontal loads; reenforces the roof framing against distortion in a horizontal plane. The means connecting the adjacent carlines are also beams and provide a place to attach a block and tackle or rope to raise the lading. These connecting means or beams for attachment of a load lifting device extend longitudinally of the car so as to provide a large range of operation which is particularly advantageous if the lading is long, such as automobiles or rails; furthermore, the weight of the sustained lading is distributed to at least two reenforced carlines.

The connecting member or load lifting beam extends longitudinally of the car and is preferably located adjacent the center of the car or may be positioned near the side plate or one near each side plate, or if desired, may be located in both or in all such positions and still come within the scope of this invention. It may be desirable to raise the load simultaneously from more than one point. The beams may extend the full length of the car and reenforce each and every carline or they may simply include a plurality of carlines and be located as desired. The preferred spacing is shown in Fig. 1.

The end plate is the end carline of a railway car for all intents and purposes of this invention, therefore, no distinction is made in the claims herein.

In the drawings:

Fig. 1 is a longitudinal section along the center of a car with all steel roof showing my device applied thereon.

Fig. 2 is a skeleton plan view of a railway car showing the preferred location of my device on the car.

Fig. 3 is a cross section of a car with my device applied thereon.

Fig. 4 is a section on line 4—4 of Fig. 3.

Fig. 5 is a fragmentary detail showing the device positioned adjacent the side plate.

Figure 6:
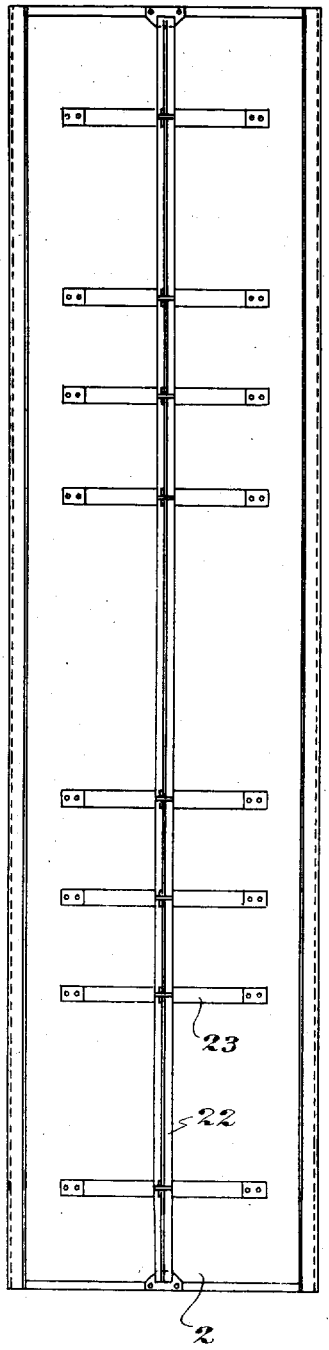
Fig. 6 is a skeleton plan view of a railway car with the beam extending the full length of the car.

The usual parts of the car are shown wherein 1 is the side plate; 2 the end plate; 20 the roof proper and 21 the carlines.

In the form illustrated the roof comprises a plurality of roof sheets spanning the distance between the opposite side plates and having upstanding flanges at their adjacent edges which are secured together. The carline-cap 21 straddles the adjacent flanges forming a waterproof construction, which cap is made strong enough to perform the functions of a carline. A bracket 24 is positioned between the flanges of adjacent roof sheets and is provided with a depending portion by which the load lifting or supporting beam 22 is supported.

The beam extends longitudinally of the car below the carlines 21 and is spaced way from the roof 20. This beam 22 then serves as a place for the attachment of a block and tackle or rope so as to provide means to assist in moving the lading. I have shown a beam of inverted T section having oppositely disposed flanges for attachment of an ice tong or similar device. This beam passes under a plurality of carlines. Below each carline and parallel thereto is a brace 23 which has its middle portion secured to the beam and its extremities attached to the carline (by rivets 10). The beam is also secured to the carline by attachments 24. By this arrangement the carline is trussed because the brace 23 becomes a tension member and the members 22 and 24 make a strut, thereby reenforcing the carline to sustain vertical loads. However, any other brace or member may be used to hold the beam 22 in alignment and position.

Fig. 5 shows a support 30 for the beam 31 adjacent the side plate of the car.

This is a division of my co-pending application Serial No. 7,560, filed February 7, 1925, Patent No. 1,678,510, July 24, 1928.

I claim:

1. In a railway car, the combination of roof sheets, carlines positioned above said roof sheets, a beam extending normal to said carlines and supported thereby and separated from said roof sheets, and braces for said beam secured thereto and to said carlines.

2. In combination with a car roof structure comprising metallic roof sheets, and exterior carlines arranged to form a flush interior surface; a beam positioned normally to said carlines and supported thereby and separated from said roof sheets, and braces for said beam secured thereto, and to said carlines.

3. In a railway car, the combination of a plurality of roof sheets having upstanding flanges at their adjacent margins secured together; brackets positioned between the flanges of adjacent roof sheets and secured thereto, and a load lifting beam extending longitudinally of the car supported by said brackets.

4. In a railway car, the combination of a plurality of roof sheets having upstanding flanges at their adjacent margins secured together, brackets positioned between the flanges of adjacent roof sheets and secured thereto, and a load lifting beam extending longitudinally of the car supported by said brackets, said beam being spaced away from the roof sheets.

CHARLES HARTER.